Patented Dec. 7, 1943

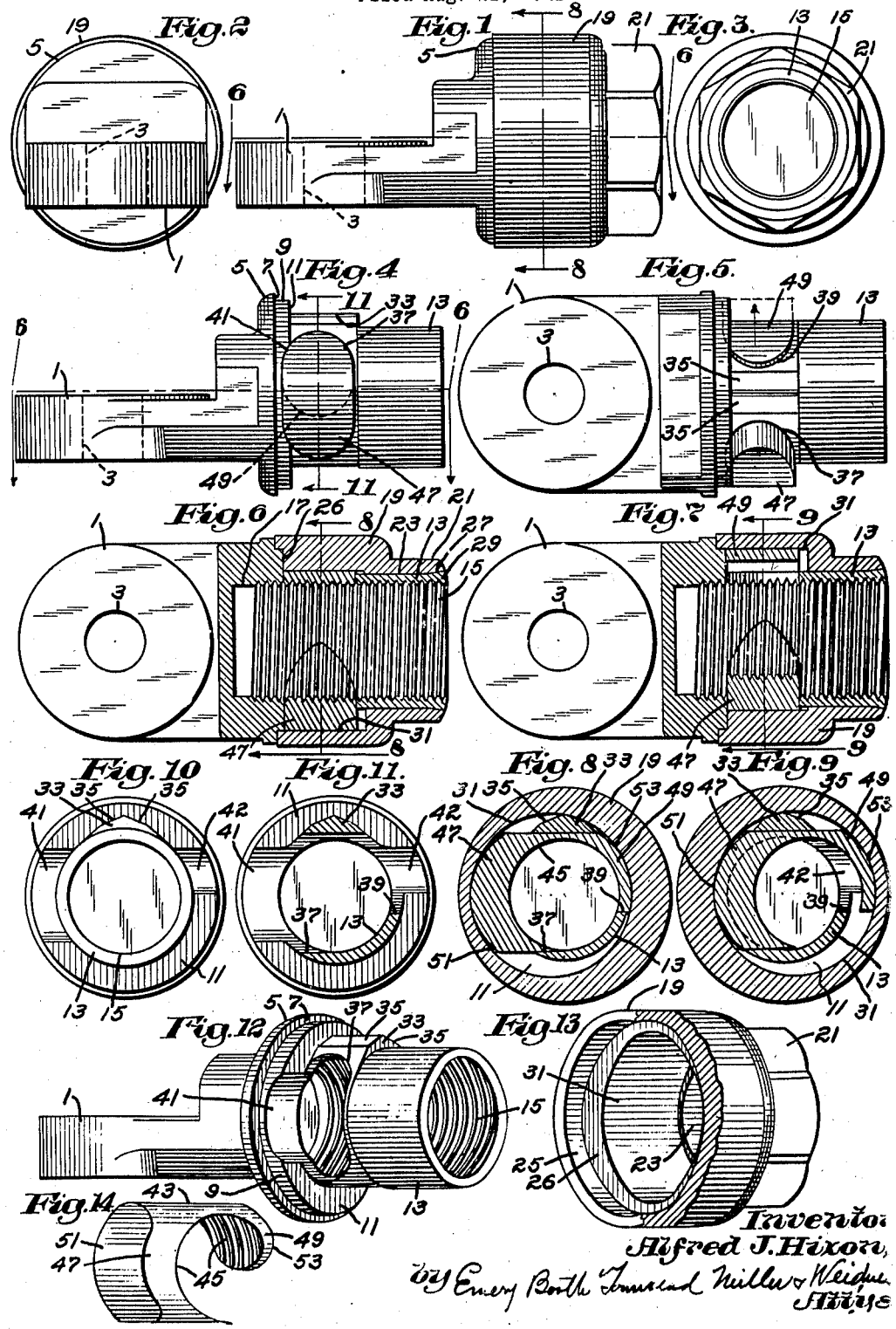

2,336,175

UNITED STATES PATENT OFFICE 2,336,175

CONNECTOR

Alfred J. Hixon, Braintree, Mass.

Application August 21, 1941, Serial No. 407,759

10 Claims. (Cl. 173—269)

My invention relates to connectors, particularly those for cables and similar conductors, and constitutes an improvement in the connector forming the subject matter of my Patent No. 2,159,153, issued May 23, 1939.

The invention, which has among its objects the provision of a connector which will strongly grip the cable with assurance that any twisting of the cable will not loosen the grip of the connector on it, will be best understood from the following description and accompanying drawing of an embodiment of the invention selected for illustrative purposes, while the scope of the invention will be more particularly pointed out in the appended claims.

In the drawing:

Fig. 1 is a side elevation of a terminal lug embodying a connector according to the invention;

Figs. 2 and 3 are left hand and right hand end elevations, respectively, of the terminal lug according to Fig. 1;

Figs. 4 and 5 are a side elevation and plan, respectively, of the terminal lug according to Fig. 1 with the outer member for operating the cable gripper removed;

Fig. 6 is a section on the line 6—6 of Fig. 1, this section line also being applied to Fig. 4 for convenience in following the drawing;

Fig. 7 is a view corresponding to Fig. 6 with the parts in a different operative position;

Fig. 8 is a section on the line 8—8 of Fig. 6, this section line also being applied to Fig. 1 for convenience in following the drawing;

Fig. 9 is a section on the line 9—9 of Fig. 7, and corresponds to Fig. 8 with the parts in a different operative position;

Fig. 10 is an end elevation of the parts shown by Fig. 4 with the cable gripper omitted, as viewed from the right in Fig. 4;

Fig. 11 is a section on the line 11—11 of Fig. 4 with the cable gripper omitted;

Fig. 12 is an isometric view of the parts shown by Fig. 4 with the cable gripper omitted;

Fig. 13 is an isometric view, with parts broken away, of that part of the terminal lug according to Fig. 1 which provides the outer sleeve; and Fig. 14 is an isometric view of the cable gripper.

Referring to the drawing, the terminal lug comprises a base portion 1 having the perforation 3 for receiving a bolt or the like for securing the terminal lug to any other part as, for example, a bus-bar.

The part of the terminal lug which provides the base portion 1, as shown, is formed intermediate its length with a circular flange 5 forming at one side thereof an annular shoulder 7, while adjacent this shoulder is a smaller diameter cylindrical bearing surface 9 the side of which opposite the flange 5 forms a second annular shoulder 11. Extending forwardly of the annular shoulder 11 is a sleeve 13. The end of the cable to be connected to the terminal lug is adapted to be inserted in the bore 15 of the sleeve 13 and the aligned bore 17 surrounded by the flange 5 and cylindrical bearing surface 9. Conveniently these bores are roughened as, for example, tapping them to form screwthreads so as better to contact with and grip the cable.

The cable gripper operating member comprises a sleeve 19 provided at one end thereof with a nut 21. As shown, the part 19, 21 is formed with an internal bore 23 rotatably mounted on the sleeve 13 and with a coaxial bore 25 rotatably mounted on the bearing surface 9. For securing the part 19, 21 in assembled relation with the sleeve 13 the nut 21 at its outer end is formed with a frusto-conical recess 27 of slight taper, the outer end of the sleeve 13 being expanded after the part 19, 21 is placed over the sleeve 13 to form a portion 29 contacting the walls of this recess.

As shown, the part of the member 19, 21 between the coaxial bores 23 and 25 thereof is formed to provide an internal cylindrical eccentric surface 31 of larger diameter than the sleeve 13, the shoulder 26 between the eccentric surface and the bore 25 abutting the shoulder 11 of the other member. As shown, the sleeve 13 has an exterior projecting lug 33 surrounded by the eccentric surface 31. This lug is shaped to provide on its outer end a pair of surfaces 35, one of which latter is adapted to contact the eccentric surface 31 when the outer sleeve 19 is rotated into the position shown by Fig. 8 and the other of which is adapted to contact said surface when the outer sleeve 19 is rotated counterclockwise through 180° from the position shown by Fig. 8 to the position shown by Fig. 9. This lug and the surfaces 35 therefore act as stops to determine the limits of rotation of the sleeve 19 in the opposite direction relative to the sleeve 13.

As illustrated, the sleeve 13 is provided with a lateral opening 37 in one wall and a lateral opening 39 in its opposite wall, the adjacent side of the shoulder 11 being grooved, as indicated at 41 and 42, to form in effect part of these openings. As is clear from Fig. 4, each opening, as shown, is approximately a rectangle with rounded ends.

Extending through the openings 37 and 39 in the sleeve 13 is a cable gripper 43 which is an approximately C-shaped member having a convex surface 45 adapted to embrace the cable. The larger end 47 of the cable gripper, as will be clear from the drawing, has a cross-section adapting it to fit the opening 37 of the inner sleeve, while the smaller end 49 has a cross-section adapting it to fit the opening 39 thereof. The opposite end surfaces 51 and 53 of the cable gripper are rounded approximately to conform to the eccentric surface 31 at diametrically opposite portions thereof so that when the outer sleeve 19 is rotated alternately in opposite directions the cable gripper will be reciprocated transversely of the bore 15 of the inner sleeve. During this reciprocatory motion the cable gripper is guided by the walls of the openings 37 and 39 and those of the grooves 41 and 42.

When the cable gripper is in the position shown by Figs. 6 and 8, the convex surface 45 of the cable gripper, which is of the same radius as the cable receiving bore 15 of the sleeve 13, will be coaxial with said bore, and thus will permit a cable to be inserted in the bores 15 and 17, the eccentric surface 31 then being against one of the stop surfaces 35 to insure this alignment of the surface 45 of the cable gripper and the surface of the bore 15. By means of the nut 21 the outer sleeve may then be rotated to force the cable gripper into firm engagement with the cable. The maximum displacement of the cable gripper occurs when the eccentric has been rotated from the position of parts shown by Fig. 8 to the position of parts shown by Fig. 9, in which latter position the eccentric surface 31 is against the opposite stop surface 35 to that which it is against in the position of parts shown by Fig. 8. It will be understood that the stop surface 35 which the eccentric surface 31 contacts when the parts are in the position shown by Fig. 8 automatically insures that the cable gripper will be in proper position to permit the cable to be inserted.

It will be observed that in the present construction the cable contacts with only the cable gripper and inner walls of the bores 15 and 17, and that therefore twisting of the cable has no tendency whatsoever to rotate the eccentric surface 31 and release the cable.

It will be understood that, within the scope of the appended claims, wide deviations may be made from the form of the invention herein described without departing from the spirit of the invention.

I claim:

1. A cable connector having, in combination, an inner sleeve, an outer sleeve surrounding said inner sleeve and rotatably mounted thereon, the inner sleeve having opposite transverse openings in the wall thereof, a cable gripper extending through said openings for reciprocal movement transversely of said inner sleeve, the outer sleeve being formed with an internal cylindrical surface eccentric to the axis of rotation thereof, surrounding said inner sleeve and gripper and contacting with opposite ends of the latter whereby rotation of said outer sleeve in one direction will cause said gripper to grip a cable and lock the gripper in cable gripping position and rotation in the opposite direction will cause said gripper to release the cable, said eccentric surface being of greater diameter than that portion of said inner sleeve which it surrounds, the inner sleeve having exterior surface portions adapted to contact with said eccentric surface to act as stops for said outer sleeve to determine the opposite ends of its travel and that of said gripper.

2. A cable connector having, in combination, a pair of relatively coaxially rotatable parts, one at least of which is formed with an opening to receive a cable, one of said parts being formed with an interior cylindrical surface eccentric to the axis of relative rotation of said parts, the other of said parts having means surrounded by said cylindrical surface adapted to contact therewith to act as stops for determining the limits of relative rotation of said parts in opposite directions, a cable gripper mounted for movement transversely of said opening and positioned for gripping and releasing by such movement a cable received by said opening, and means operated by relative rotation of said parts for so moving said gripper.

3. A cable connecter according to claim 2 in which the cable gripper is mounted for substantially rectilinear movement on the part having the means acting as the stops.

4. A cable connector according to claim 2 in which the cable gripper is an approximately C-shaped part adapted to embrace the cable, and is mounted for substantially rectilinear movement on the part having the stop means.

5. A cable connector having, in combination, an inner sleeve, an outer sleeve surrounding said inner sleeve and rotatably mounted thereon, the inner sleeve having opposite transverse openings in the wall thereof, a cable gripper extending through said openings for reciprocal movement transversely of said inner sleeve, the outer sleeve being formed with an internal surface portion acting on the gripper and shaped for moving it in one direction when said sleeves are relatively rotated in one direction, said inner sleeve having exterior stop means cooperating with said internal surface portion for determining the limit of rotation of said outer sleeve relative to said inner sleeve in that direction.

6. A cable connector having, in combination, a pair of relatively coaxially rotatable parts, one at least of which is formed with an opening to receive a cable, one of said parts being formed with an interior surface portion and the other having stop means cooperating with said portion for determining the limit of relative rotation of said parts in one direction, a cable gripper mounted for movement transversely of said opening and positioned for gripping and releasing by such movement a cable received by said opening, said gripper having a position cooperating with said interior surface portion, which latter is so shaped as to so move said gripper when said parts are relatively rotated in one direction.

7. A cable gripper according to claim 6 in which the cable gripper is mounted for substantially rectilinear movement on the part having the stop means.

8. A cable gripper according to claim 6 in which the cable gripper is an approximately C-shaped part adapted to embrace the cable, and is mounted for substantially rectilinear movement on the part having the stop means.

9. A cable connector having, in combination, a part having an opening for receiving a cable, a cable gripper having opposite relatively parallel exterior side walls mounted in an open ended opening formed in said part, which opening has opposite relatively parallel interior walls cooperating with said exterior walls of said gripper for guiding the latter for rectilinear movement transversely of said part for gripping and releasing a cable, a second part rotatably surrounding said first part and gripper and having interior cam surfaces cooperating with opposite end portions of said gripper exterior of said first part for reciprocating said gripper when said parts are relatively rotated in opposite directions.

10. A cable connector according to claim 9 in which the gripper is an approximately C-shaped part adapted to embrace the cable.

ALFRED J. HIXON